(12) United States Patent
Goel

(10) Patent No.: US 11,503,002 B2
(45) Date of Patent: Nov. 15, 2022

(54) PROVIDING ANONYMOUS NETWORK DATA TO AN ARTIFICIAL INTELLIGENCE MODEL FOR PROCESSING IN NEAR-REAL TIME

(71) Applicant: Juniper Networks, Inc., Sunnyvale, CA (US)

(72) Inventor: Prateek Goel, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 302 days.

(21) Appl. No.: 16/928,699

(22) Filed: Jul. 14, 2020

(65) Prior Publication Data

US 2022/0021659 A1    Jan. 20, 2022

(51) Int. Cl.
*H04L 9/40* (2022.01)
*G06N 20/00* (2019.01)
*G06N 5/04* (2006.01)

(52) U.S. Cl.
CPC .......... *H04L 63/0428* (2013.01); *G06N 5/04* (2013.01); *G06N 20/00* (2019.01)

(58) Field of Classification Search
CPC ... H04L 63/0428; H04L 41/145; H04L 41/16; H04L 41/40; H04L 43/0876; H04L 43/20; H04L 63/0421; H04L 69/22; G06N 5/04; G06N 20/00; G06F 21/6254
See application file for complete search history.

(56) References Cited

U.S. PATENT DOCUMENTS

| | | | |
|---|---|---|---|
| 2007/0050846 A1* | 3/2007 | Xie | H04L 63/1425 726/22 |
| 2010/0023338 A1* | 1/2010 | Petronelli | G06Q 30/02 705/1.1 |
| 2014/0047551 A1 | 2/2014 | Nagasundaram et al. | |
| 2014/0379775 A1* | 12/2014 | Korangy | H04L 41/40 709/201 |
| 2020/0117831 A1 | 4/2020 | Eckhard et al. | |
| 2021/0117417 A1* | 4/2021 | Hendrickson | G06N 20/00 |

(Continued)

FOREIGN PATENT DOCUMENTS

GB    2576332 A    2/2020

OTHER PUBLICATIONS

Extended European Search Report for Application No. EP20194656.3, dated Feb. 2, 2021, 7 pages.

*Primary Examiner* — El Hadji M Sall
(74) *Attorney, Agent, or Firm* — Harrity & Harrity, LLP

(57) ABSTRACT

A device may receive, from a network device in near-real time, a packet of data associated with network traffic of a network, wherein the packet includes privacy-related data and network-related data. The device may read the privacy-related data from the packet. The device may generate anonymous data based on the privacy-related data, wherein the anonymous data obscures the privacy-related data. The device may generate a mapping between the anonymous data and the privacy-related data. The device may combine the anonymous data and the network-related data to generate a masked packet. The device may provide the masked packet to a server device. The device may receive, from the server device, data identifying a recommendation that is generated by processing the masked packet with an artificial intelligence model. The device may perform one or more actions based on the recommendation.

20 Claims, 14 Drawing Sheets

(56) References Cited

U.S. PATENT DOCUMENTS

2021/0125083 A1\* 4/2021 Ogawa ................... G06N 20/00
2021/0209705 A1\* 7/2021 Englard ................. G06N 20/00
2021/0256447 A1\* 8/2021 Cmielowski ..... G06Q 10/06393

\* cited by examiner

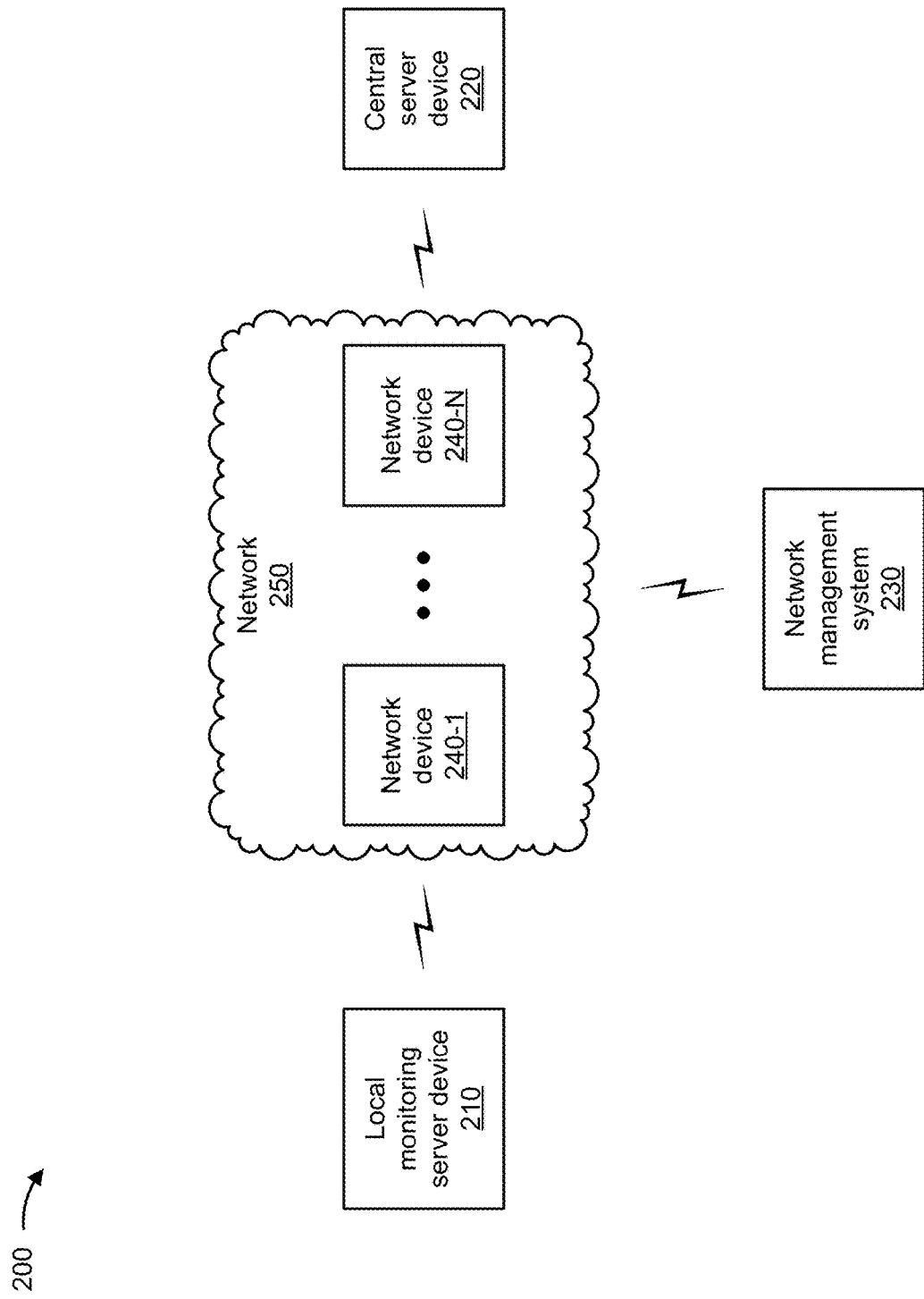

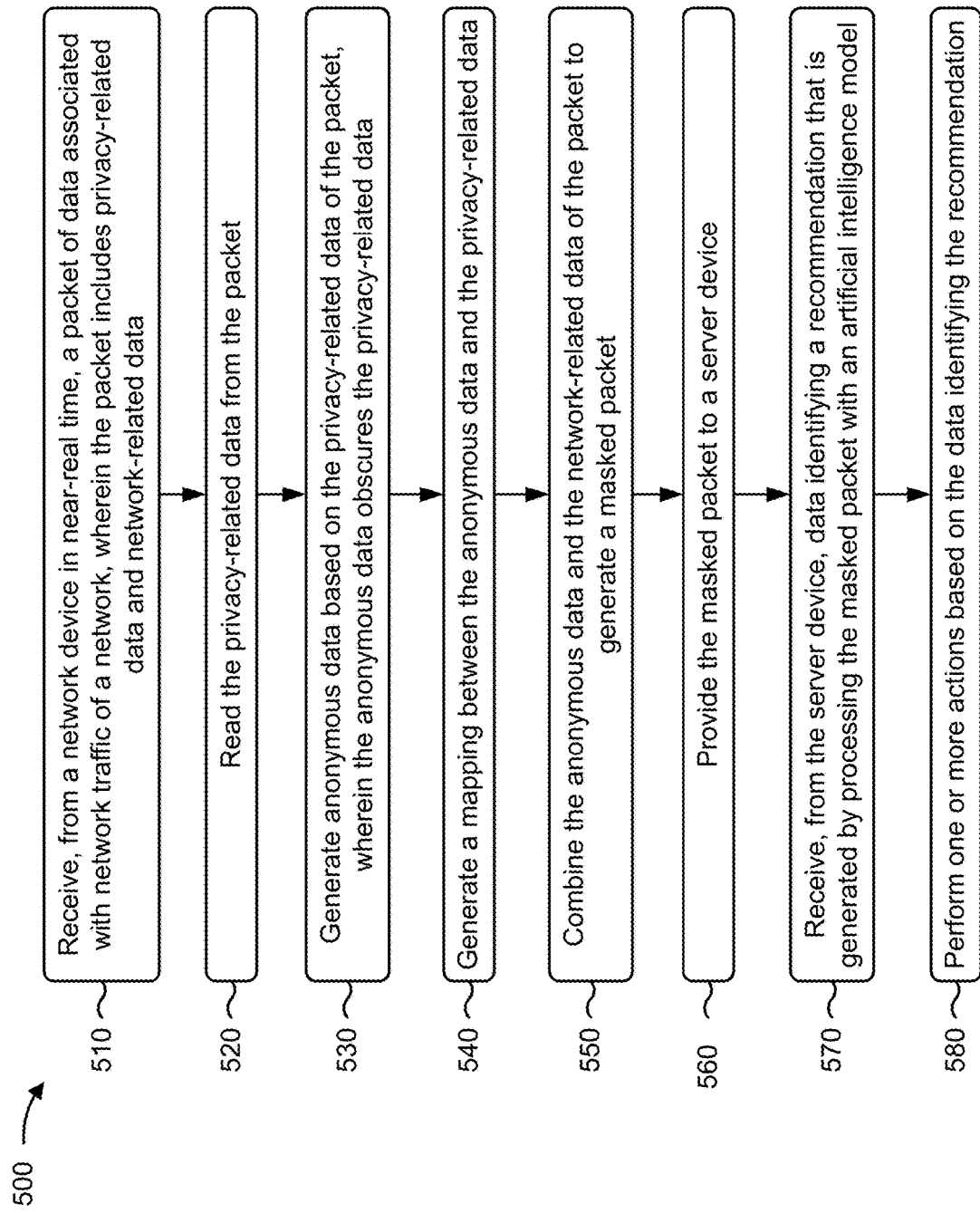

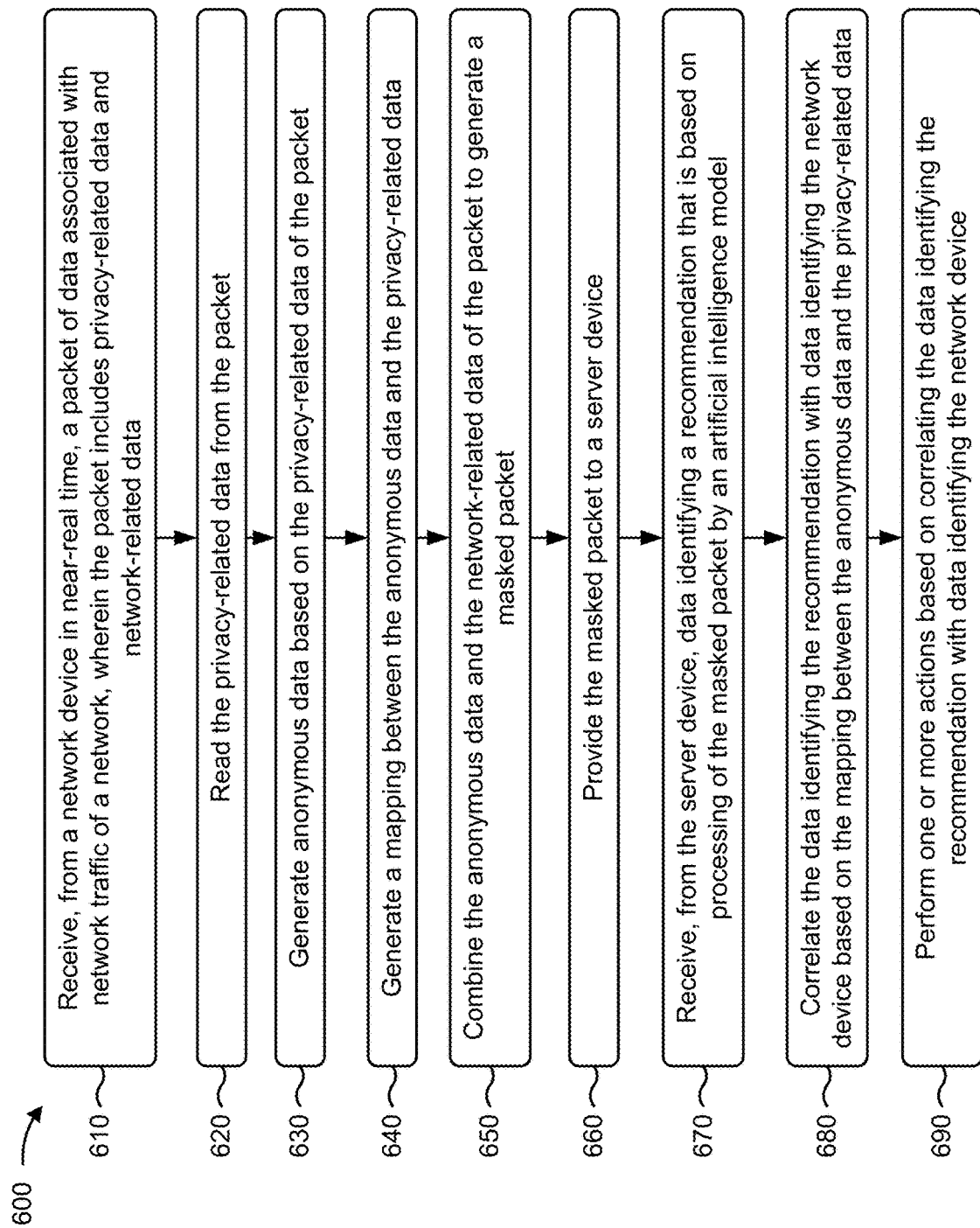

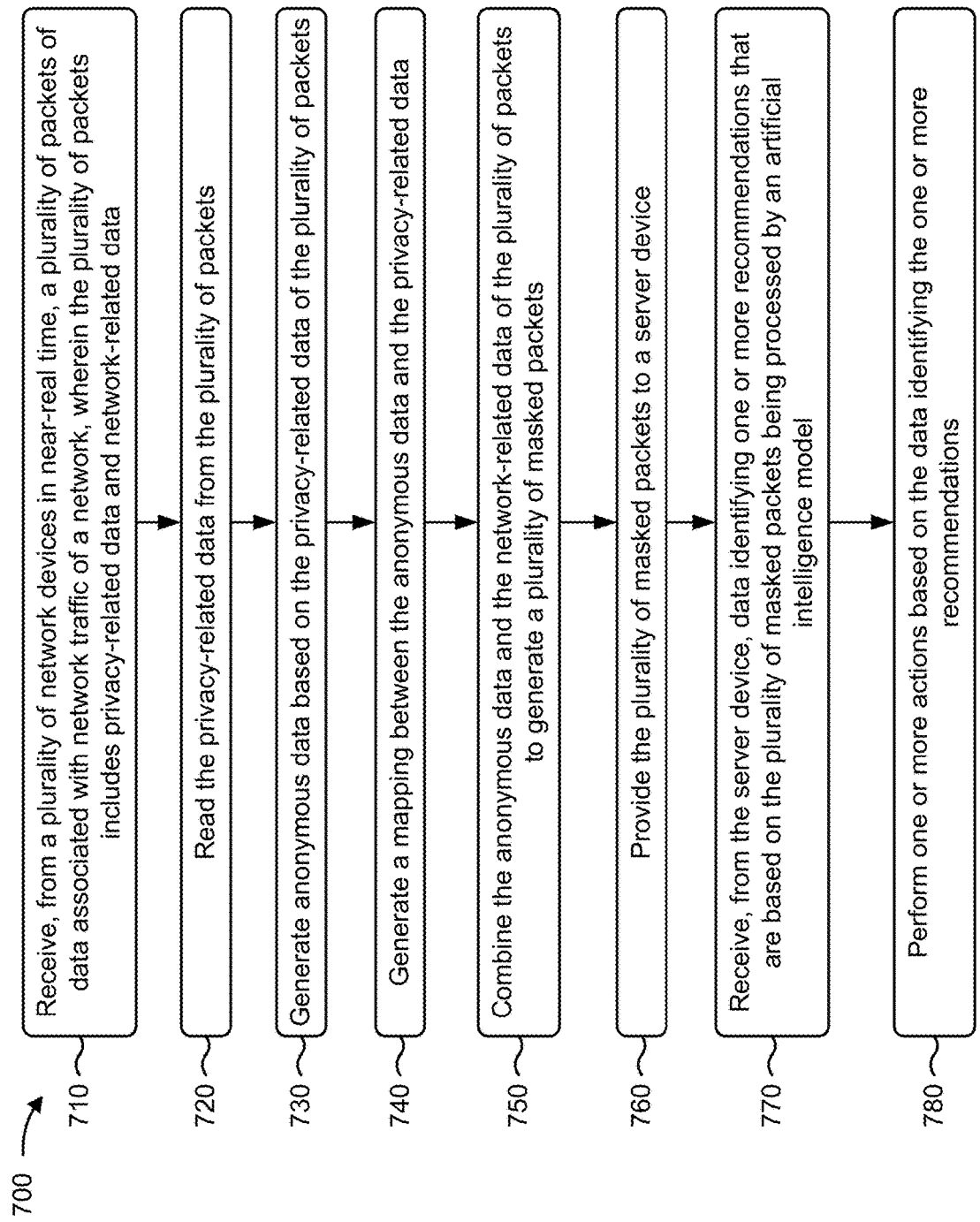

PROVIDING ANONYMOUS NETWORK DATA TO AN ARTIFICIAL INTELLIGENCE MODEL FOR PROCESSING IN NEAR-REAL TIME

BACKGROUND

Network analysis is a process of capturing and analyzing network traffic. The network analysis may be performed to determine one or more conditions of a network. For example, the network analysis may be performed to troubleshoot a network issue, identify a security issue, determine a key performance indicator associated with the network, and/or the like.

SUMMARY

In some implementations, a method includes receiving, by a device and from a network device in near-real time, a packet of data associated with network traffic of a network, wherein the packet includes privacy-related data and network-related data; reading, by the device, the privacy-related data from the packet; generating, by the device, anonymous data based on the privacy-related data of the packet, wherein the anonymous data obscures the privacy-related data; generating, by the device, a mapping between the anonymous data and the privacy-related data; combining, by the device, the anonymous data and the network-related data of the packet to generate a masked packet; providing, by the device, the masked packet to a server device; receiving, by the device and from the server device, data identifying a recommendation that is generated by processing the masked packet with an artificial intelligence model; and performing, by the device, one or more actions based on the data identifying the recommendation.

In some implementations, a device includes one or more memories; and one or more processors, communicatively coupled to the one or more memories, to: receive, from a network device in near-real time, a packet of data associated with network traffic of a network, wherein the packet includes privacy-related data and network-related data; read the privacy-related data from the packet; generate anonymous data based on the privacy-related data of the packet; generate a mapping between the anonymous data and the privacy-related data; combine the anonymous data and the network-related data of the packet to generate a masked packet; provide the masked packet to a server device; receive, from the server device, data identifying a recommendation that is based on processing of the masked packet by an artificial intelligence model; and correlate the data identifying the recommendation with data identifying the network device based on the mapping between the anonymous data and the privacy-related data; and perform one or more actions based on correlating the data identifying the recommendation with data identifying the network device.

In some implementations, a non-transitory computer-readable medium storing instructions includes one or more instructions that, when executed by one or more processors, cause the one or more processors to: receive, from a plurality of network devices in near-real time, a plurality of packets of data associated with network traffic of a network, wherein the plurality of packets includes privacy-related data and network-related data; read the privacy-related data from the plurality of packets; generate anonymous data based on the privacy-related data of the plurality of packets; generate a mapping between the anonymous data and the privacy-related data; combine the anonymous data and the network-related data of the plurality of packets to generate a plurality of masked packets; provide the plurality of masked packets to a server device; receive, from the server device, data identifying one or more recommendations that are based on the plurality of masked packets being processed by an artificial intelligence model; and perform one or more actions based on the data identifying the one or more recommendations.

BRIEF DESCRIPTION OF THE DRAWINGS

FIG. 2 is a diagram of an example environment in which systems and/or methods described herein may be implemented.

FIGS. 5-7 are flow charts of example processes relating to providing anonymous network data to an artificial intelligence model for processing in near real-time.

DETAILED DESCRIPTION

Figure 1A:
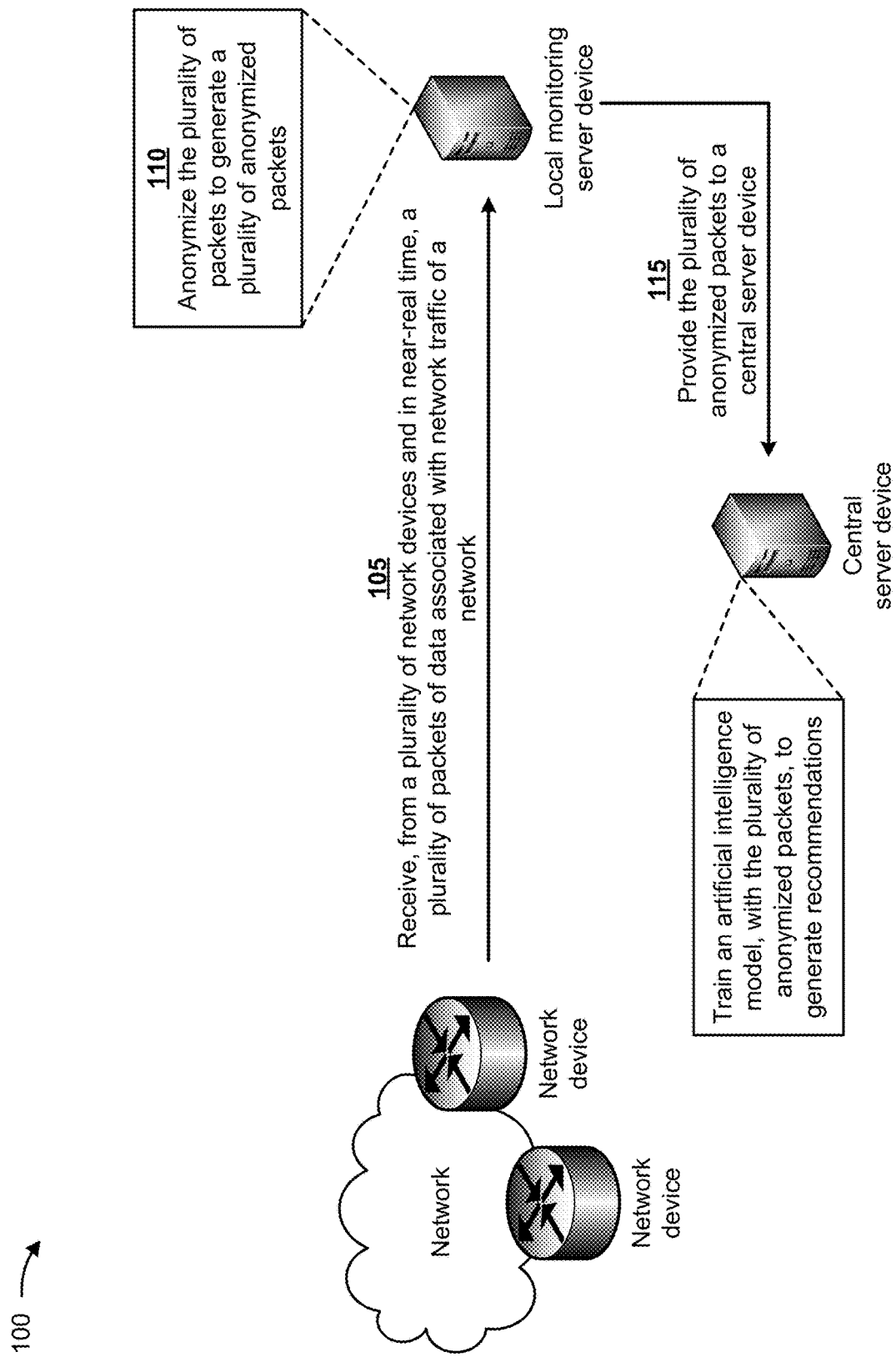
FIGS. 1A-1H are diagrams of an example implementation described herein.

The following detailed description of example implementations refers to the accompanying drawings. The same reference numbers in different drawings may identify the same or similar elements.

An artificial intelligence model (e.g., a machine learning model, a deep learning machine learning model, and/or the like) may be used to process network data to perform network analysis on a network. The effectiveness or accuracy of the artificial intelligence model, and, therefore, an effectiveness or accuracy of the network analysis, relies on the quality and quantity of data used to train the artificial intelligence model. Optimally, the data used to train the artificial intelligence model includes actual network data transmitted through the network. In some instances, a network device may include a packet capture tool that is used to capture the network data. However, the use of the packet capture tool may require the network device to utilize additional computing resources (e.g., processing resources, memory resources, communication resources, and/or the like) to implement and/or utilize the packet capture tool and may induce a delay in the processing of the network data by the network device.

Alternately, summarized network data may be obtained for training the artificial intelligence model. However, the summarized data may include only a subset of the network data transmitted via the network and/or only a summary or a portion of the data included in the subset of the network data. Thus, utilizing the summarized network data to train the artificial intelligence model may not be as effective as using the network data to train the artificial intelligence model. As such, the network analysis performed by the artificial intelligence model may be inaccurate and/or incomplete. The inaccurate and/or incomplete network analysis may cause inaccurate and/or incomplete conclusions regarding the network and/or the network device to be made thereby wasting computing resources used to implement actions made based on the inaccurate and/or incomplete conclusions.

Further, the network data may include information identifying IP addresses, ports, and/or other sensitive information (e.g., personal identifying information included in a data portion of the real-time network data). Thus, there may be privacy issues related to utilizing the network data to train the machine learning model. For example, a network operator may be required to ensure that the network data is stored in a secure manner, that a result of the network analysis does not include any sensitive information, and/or the like. Thus, computing resources may be utilized to address the privacy issues related to utilizing the network data to train the artificial intelligence model.

Some implementations described herein relate to a local monitoring server device that enables network data to be utilized to train an artificial intelligence model to generate a recommendation based on performing a network analysis and addresses privacy issues relating to utilizing the network data to train the artificial intelligence model. For example, the local monitoring server device may receive a data packet associated with network traffic being transmitted through a network from a network device. The network device may provide the data packet (e.g., a copy of the data packet) to the local monitoring server device in parallel with processing the data packet. In this way, network data can be obtained for training the artificial intelligence model to perform a network analysis and/or to generate a recommendation based on the network analysis without impacting a performance of the network and/or a performance of the network device.

The local monitoring server device may mask any privacy-related data included in the data packet. In this way, the local monitoring server device may address any privacy issues related to using the data packet to train a machine learning model. Further, masking the privacy-related data may conserve computing resources that would otherwise have been utilized to address the privacy issues.

The local monitoring server device may provide the data packet, including the masked data, to a server device that uses the data packet to train the artificial intelligence model to perform a network analysis and to generate a recommendation based on the network analysis. In this way, the local monitoring server device may enable network data to be utilized to train the artificial intelligence model thereby increasing an accuracy associated with the artificial intelligence model relative to artificial intelligence models that are trained with summarized data.

FIGS. 1A-1H are diagrams of one or more example implementations 100 described herein. As shown in FIGS. 1A-1H, example 100 includes a network management system associated with a central server device and a local monitoring server device. The network management system may include one or more device configured to identify, configure, monitor, update, troubleshoot, and/or the like network devices included in a network associated with the network management system.

The central server device may include one or more devices configured to train and/or utilize an artificial intelligence model to process masked packets to perform a network analysis and/or to generate a recommendation based on the network analysis, as described in greater detail below. The local monitoring server device may include one or more devices configured to generate the masked packets based on data packets received from a plurality of network devices, as described in greater detail below.

As shown in FIG. 1A, and by reference number 105, the local monitoring server device receives, from the plurality of network devices and in near-real time, a plurality of packets of data associated with network traffic of a network. In some implementations, the plurality of packets of data include a packet of data that is a copy of a data packet received by a network device, of the plurality of network devices. As an example, the network device may receive a data packet transmitted via the network. The network device may copy one or more portions of the data packet to generate the packet of data. The network device may transmit the packet of data to the local monitoring server device.

As shown by reference number 110, the local monitoring server device anonymizes the plurality of packets of data to generate a plurality of anonymized packets. A packet of data, of the plurality of packets of data, may include privacy-related data and network-related data. The privacy-related data may include information identifying an interface name associated with the network device, an identifier associated with the network device, a network address associated with the network device, a destination port associated with the network device, and/or the like. The network-related data may include information identifying processor usage associated with the network device, a temperature of the network device, a memory usage of the network device, an error associated with the network device, a queue usage associated with the network deice, a virtual interface usage associated with the network device, and/or the like. The local monitoring server device may anonymize the privacy-related data included in the packet of data.

In some implementations, the local monitoring server device may anonymize the privacy-related data by masking the privacy-related data. The local monitoring server device may identify an element of privacy-related data (e.g., an identifier associated with the network device). The local monitoring server device may generate anonymous data based on identifying the element of privacy-related data. The anonymous data may include randomly generated data, a hash of the element of privacy-related data, encrypted data generated by encrypting the element of privacy-related data, and/or the like. The local monitoring server device may replace the element of privacy-related data in the packet of data with the anonymous data. The local monitoring server device may replace each element of privacy-related data with respective anonymous data to anonymize the privacy-related data. The packet of data, including the anonymized privacy-related data and the network-related data may comprise an anonymized packet.

As shown by reference number 115, the local monitoring server device provides the plurality of anonymized packets to the central server device. In some implementations, the local monitoring server device may provide the plurality of anonymized packets to the central server device in near-real time. For example, the local monitoring server device may provide the plurality of anonymized packets to the central server device based on anonymizing the plurality of packets received from the plurality of network devices. Alternatively, and/or additionally, the local monitoring server device may provide the plurality of anonymized packets to the local monitoring server device periodically (e.g., every 10 milliseconds, every second, every hour, and/or the like), based on receiving a request from the central server device, and/or the like.

As shown in FIG. 1A, the central server device trains an artificial intelligence model, with the plurality of anonymized packets, to generate recommendations. The artificial intelligence model may include a machine learning model, a deep learning machine learning model, and/or the like. The artificial intelligence model may be trained based on the plurality of anonymized packets and historical data relating to network analyses related to the network. The artificial intelligence model may be trained to perform a network analysis based on the plurality of anonymized packets, to determine a recommendation based on the network analysis, to determine a confidence score that reflects a measure of confidence that the network analysis is accurate for this plurality of anonymized packets, to determine a confidence score that reflects a measure of confidence that the recommendation is accurate for this network analysis, and/or the like.

The artificial intelligence model may perform the network analysis to identify one or more conditions associated with the network and/or a network device, a security issue associated with the network and/or the network device, a key performance indicator associated with the network and/or the network device, and/or the like. The recommendation may include information identifying a result of the network analysis, one or more portions of the anonymous data included in the plurality of anonymized packets, information identifying an action (e.g., an action for resolving an issue indicated by the result of the network analysis), and/or the like.

In some implementations, a machine learning system is used to train the artificial intelligence model. The machine learning system may include or may be included in a computing device, a server device, a cloud computing environment, and/or the like, such as the central server device. The artificial intelligence model may be trained using a set of observations. The set of observations may be obtained from anonymized packets, such as anonymized packets generated based on one or more processes described herein. In some implementations, the machine learning system may receive the set of observations (e.g., as input) from the central server device.

The set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from central server device. For example, the machine learning system may identify a feature set (e.g., one or more features and/or feature values) by extracting the feature set from structured data, by performing natural language processing to extract the feature set from unstructured data, by receiving input from an operator, and/or the like.

The set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation.

The target variable may represent a value that the artificial intelligence model is being trained to predict, and the feature set may represent the variables that are input to a trained artificial intelligence model to predict a value for the target variable. The set of observations may include target variable values so that the artificial intelligence model can be trained to recognize patterns in the feature set that lead to a target variable value. An artificial intelligence model that is trained to predict a target variable value may be referred to as a supervised learning model.

In some implementations, the artificial intelligence model may be trained on a set of observations that do not include a target variable. This may be referred to as an unsupervised artificial intelligence model. In this case, the artificial intelligence model may learn patterns from the set of observations without labeling or supervision, and may provide output that indicates such patterns, such as by using clustering and/or association to identify related groups of items within the set of observations.

The machine learning system may train the artificial intelligence model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the artificial intelligence model as a trained artificial intelligence model to be used to analyze new observations.

Figure 1B:
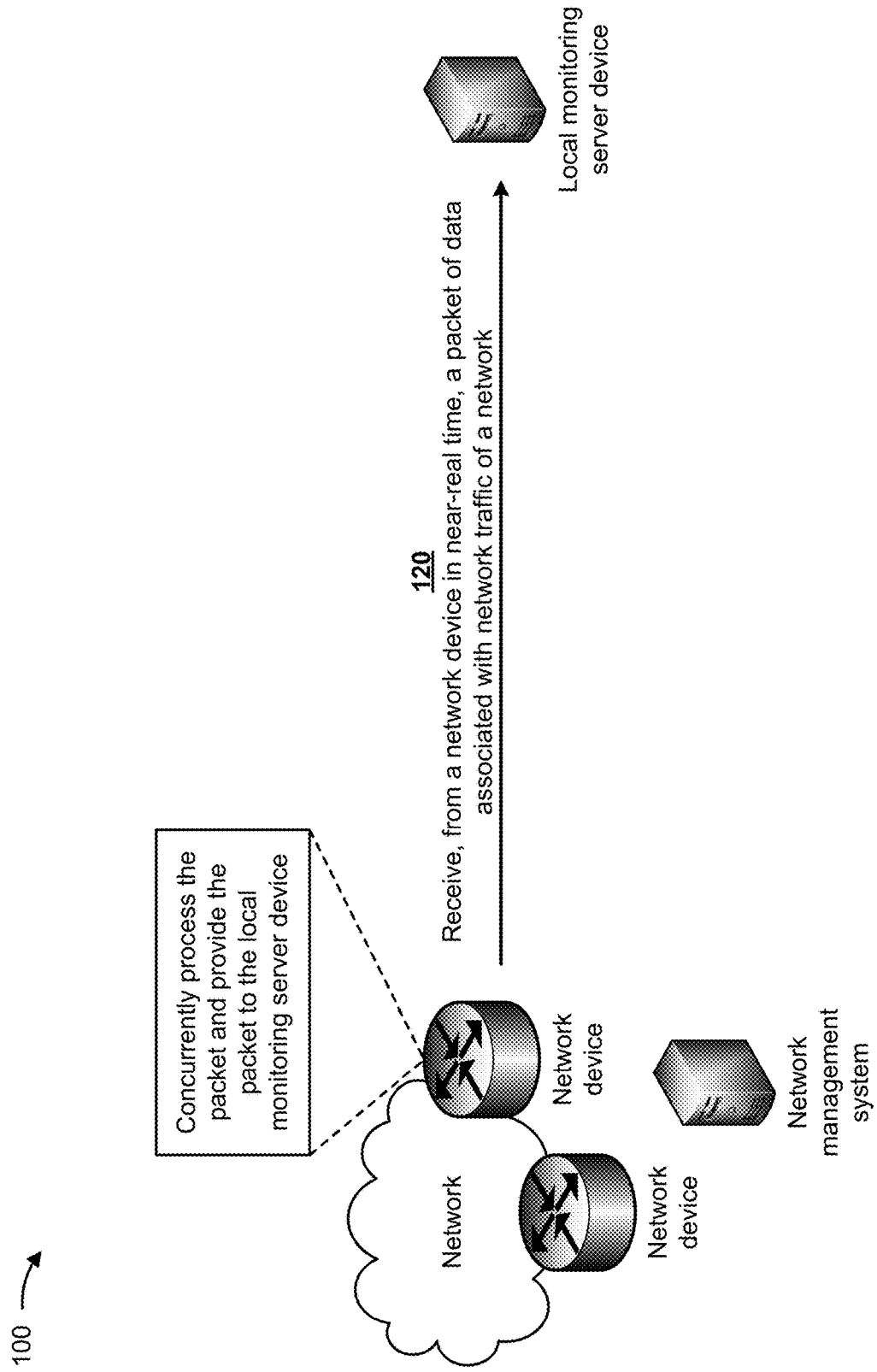

As shown in FIG. 1B, and by reference number 120, the local monitoring server device receives, from a network device in near-real time, a packet of data associated with network traffic of a network. As an example, the network device may be associated with a data center and the packet of data may be a data packet that includes a header portion and a data portion. The header portion may include information identifying a source IP address, information identifying a destination IP address, information identifying the network device, information identifying a port of the network device, and/or the like. The data portion may include data associated with the data center. For example, the data portion may include data to be stored by the data center, data retrieved from the data center, and/or the like.

In some implementations, the packet of data may include a copy of the data packet. For example, the network device may generate a copy of the data packet based on receiving the data packet at the network device. As shown in FIG. 1B, the network device concurrently processes the data packet and provides the packet of data (e.g., the copy of the data packet) to the local monitoring server device. The network device may process the data packet for forwarding the data packet toward a destination of the data packet in parallel with transmitting the packet of data to the local monitoring server device. In this way, the local monitoring server device may receive the packet of data in near-real time without introducing a delay in the processing of network traffic and/or without impacting a performance of the network device associated with processing the data packet for forwarding the data packet toward the destination of the data packet.

Figure 1C:
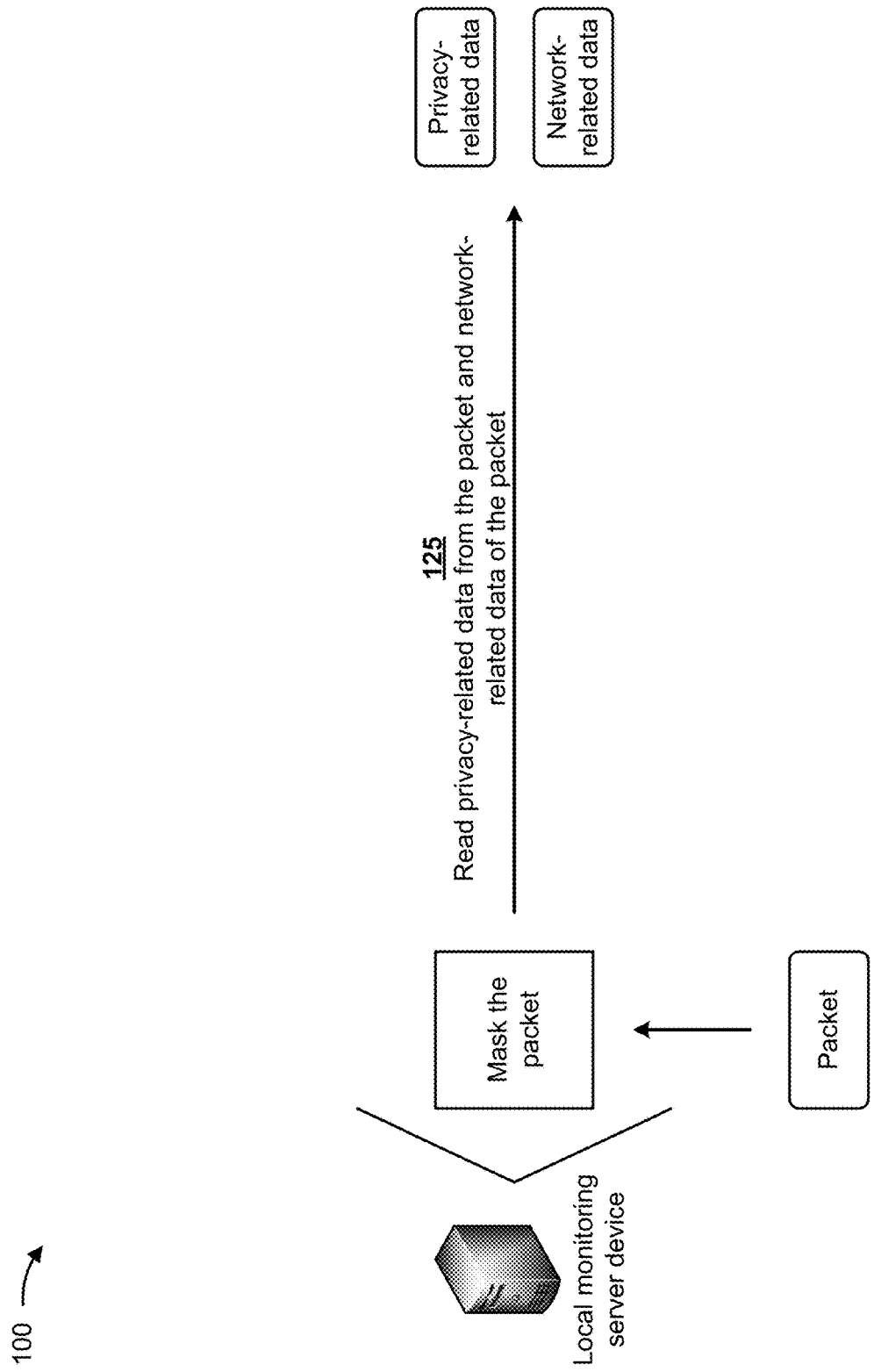

The local monitoring server device may mask any privacy-related data included in the packet of data and generate a masked packet based on receiving the packet of data from the network device, as described below with respect to FIGS. 1C-1E. For example, as shown in FIG. 1C, and by reference number 125, the local monitoring server device may read privacy-related data from the packet of data and network-related data of the packet of data.

In some implementations, the packet of data includes the header portion and the data portion of the data packet received by the network device (e.g., a copy of the header portion and the data portion of the data packet). The local monitoring server device may strip and/or discard the data portion and may read the privacy-related data and the network-related data from the header portion. In this way, the local monitoring server device may ensure that sensitive information included in the data portion is protected thereby addressing any privacy issues that may be associated with sensitive information included in the data portion.

In some implementations, the local monitoring server device includes information associated with the data portion in the header portion based on stripping and/or discarding the data portion. For example, the local monitoring server device may include, in the header portion, information indicating a size of the data portion, information indicating a format of the data portion, and/or the like. In this way, the local monitoring server device may enable the information associated with the data portion to be utilized by the artificial intelligence model when performing the network analysis and/or generating the recommendation.

Figure 1D:
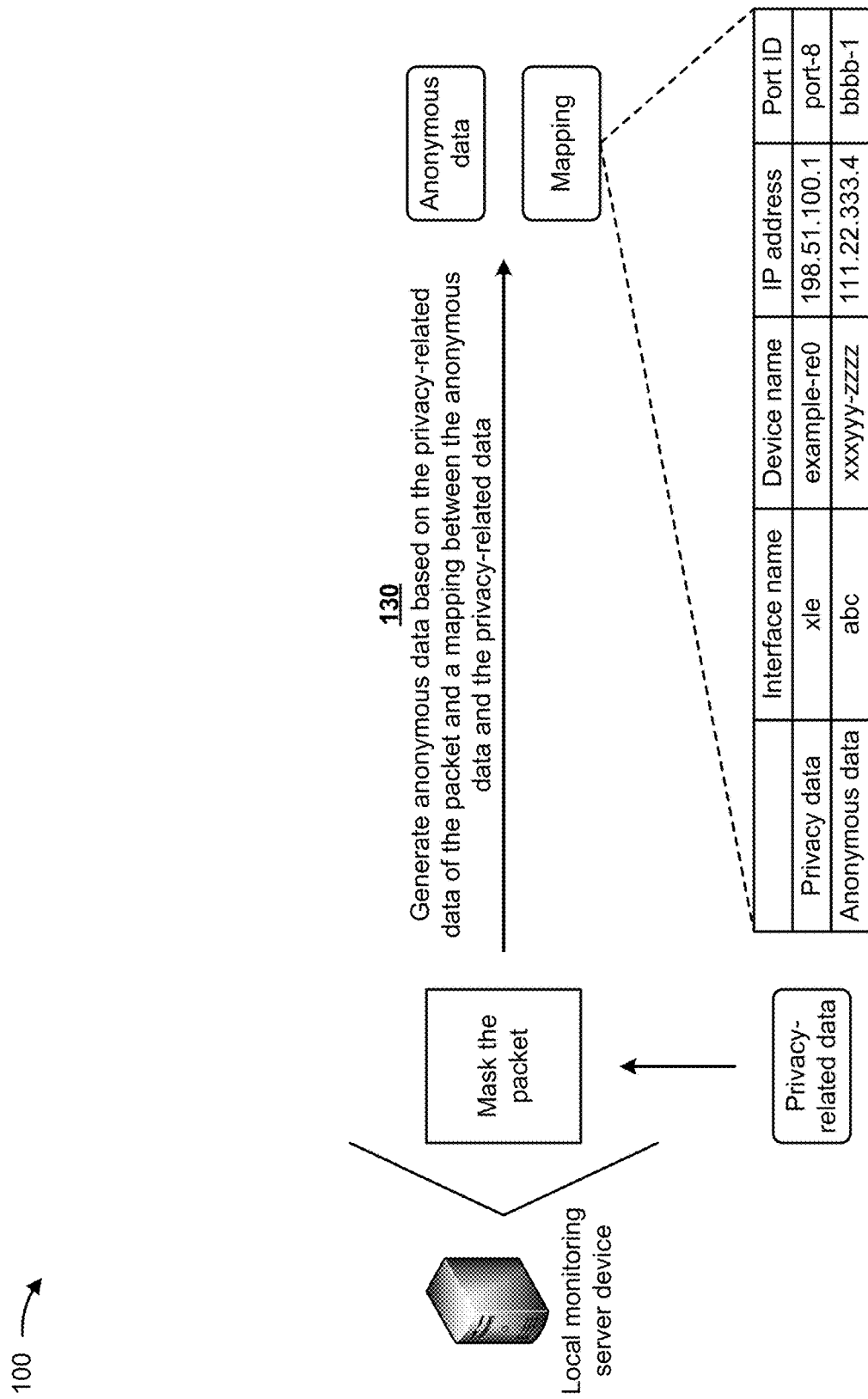

As shown in FIG. 1D, and by reference number 130, the local monitoring server device may generate anonymous data based on the privacy-related data of the packet and a mapping between the anonymous data and the privacy-related data. As shown in FIG. 1D, the privacy-related data includes information identifying an interface name (e.g., an identifier associated with an interface of the network device associated with the data packet), a device name (e.g., an identifier associated with the network device), an IP address (e.g., a source IP address, a destination IP address, and/or the like), and a port ID (e.g., an identifier associated with a port of the network device associated with the data packet).

The local monitoring server device may generate anonymous data for the interface name (e.g., abc, as shown in FIG. 1D), the device name (e.g., xxxyyy-zzzz, as shown in FIG. 1D), the IP address (e.g., 111.22.333.4, as shown in FIG. 1D), and the port ID (e.g., bbbb-1, as shown in FIG. 1D) based on reading the privacy-related data from the packet of data. As shown in FIG. 1D, the local monitoring server device generates a mapping between the anonymous data and the privacy-related data based on generating the anonymous data. In some implementations, the local monitoring server device may generate the anonymous data and generate the mapping between the anonymous data and the privacy-related data in a manner similar to that described above with respect to FIG. 1A. The local monitoring server device may store the mapping in a data structure (e.g., a database, a table, a list, and/or the like) associated with the local monitoring server device based on generating the mapping.

Figure 1E:
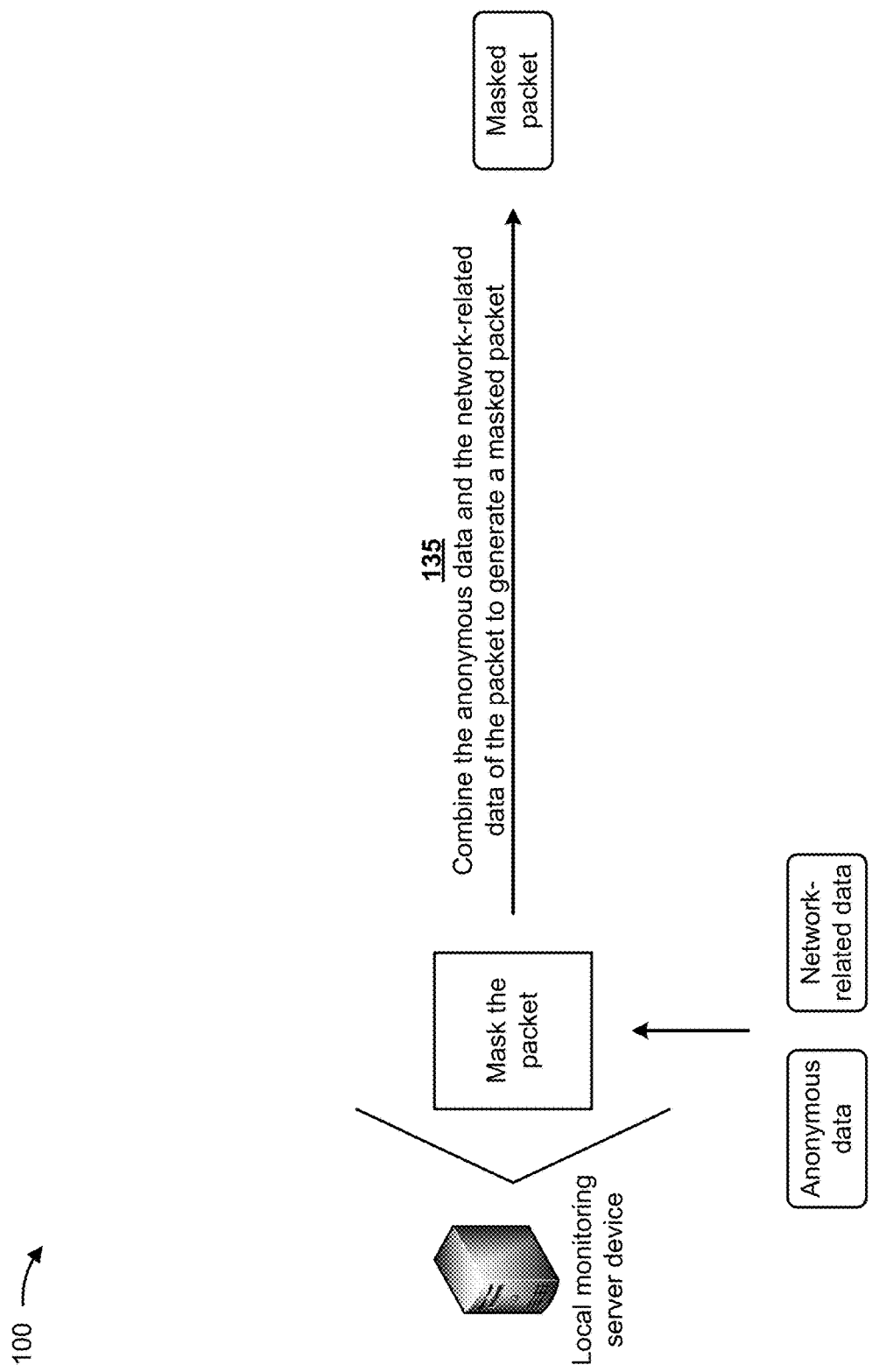

As shown in FIG. 1E, and by reference number 135, the local monitoring server device combines the anonymous data and the network-related data of the packet to generate a masked packet. For example, the local monitoring server device may replace the privacy-related data with the anonymous data in the packet of data to generate the masked packet. Alternatively, and/or additionally, the local monitoring server device may generate a new packet of data that includes the anonymous data and the network-related data. By generating the masked packet, the local monitoring server device may address any privacy issues related to using the data packet to perform the network analysis and/or to generate the recommendation. Further, masking the privacy-related data may conserve computing resources that would otherwise have been utilized to address the privacy issues.

Figure 1F:
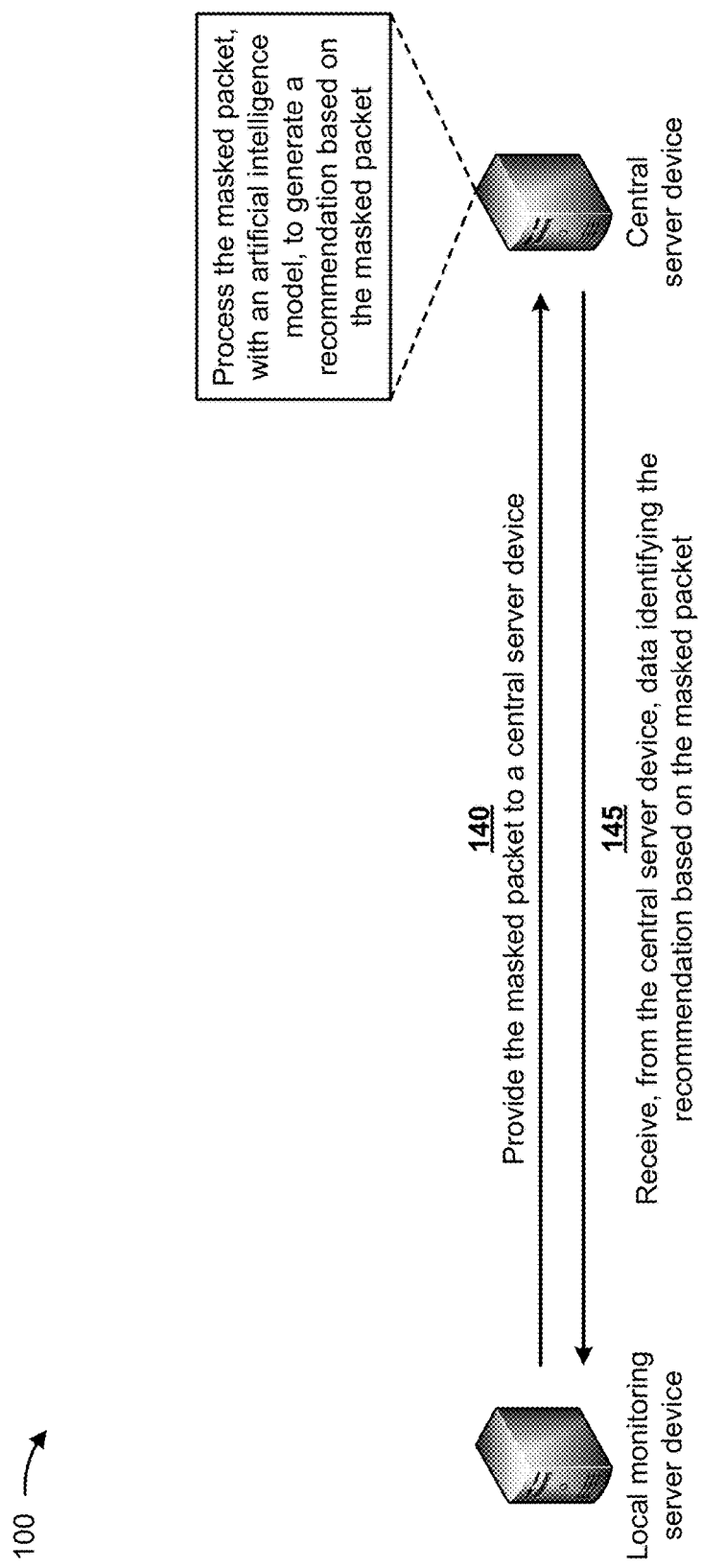

As shown in FIG. 1F, and by reference number 140, the local monitoring server device provides the masked packet to the central server device. In some implementations, the local monitoring server device provides the masked packet to the central server device based on generating the masked data. In some implementations, the local monitoring server device provides the masked packet to the central server device periodically, after generating a particular quantity of masked packets, based on receiving a request from the central server device, and/or the like.

As shown in FIG. 1F, the central server device processes the masked packet, with an artificial intelligence model, to generate a recommendation based on the masked packet. The central server device may apply the trained artificial intelligence model to a new observation (e.g., a new masked packet), such as by receiving a new observation and inputting the new observation to the trained machine learning model. The central server device may apply the trained artificial intelligence model to the new observation to generate an output (e.g., a result). The type of output may depend on the type of artificial intelligence model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

Based on this prediction, the artificial intelligence model may provide a first recommendation, may provide output for determination of a first recommendation, may perform a first automated action, may cause a first automated action to be performed (e.g., by instructing another device to perform the automated action), and/or the like.

In some implementations, the artificial intelligence model may classify (e.g., cluster) the new observation in a cluster. The observations within a cluster may have a threshold degree of similarity. As an example, if the artificial intelligence model classifies the new observation in a first cluster, then the artificial intelligence model may provide a first recommendation. Additionally, or alternatively, the artificial intelligence model may perform a first automated action and/or may cause a first automated action to be performed (e.g., by instructing another device to perform the automated action) based on classifying the new observation in the first cluster.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the artificial intelligence model may apply a rigorous and automated process to performing a network analysis and/or generating a recommendation. The artificial intelligence model enables recognition and/or identification of tens, hundreds, thousands, or millions of features and/or feature values for tens, hundreds, thousands, or millions of observations, thereby increasing accuracy and consistency and reducing delay associated with performing a network analysis and/or generating a recommendation relative to requiring computing resources to be allocated for tens, hundreds, or thousands of operators to manually perform a network analysis and/or generate a recommendation using the features or feature values.

As shown by reference number 145, the local monitoring server device receives, from the central server device, data identifying the recommendation based on the masked packet. The data identifying the recommendation may include information associated with a result of the network analysis, information associated with reducing a processor usage associated with the network device, information associated with reducing a temperature of the network device, information associated with reducing a memory usage of the network device, information associated with correcting an error associated with the network device, information associated with reducing a queue usage associated with the network device, reducing a virtual interface usage associated with the network device, and/or the like. The above-listed information is intended to be merely examples of types of information that may be included in the data identifying the recommendation. In practice, the data identifying the recommendation may include any one or more of the above-listed information and/or other information not listed above.

In some implementations, the local monitoring server device provides a plurality of masked packets to the central server device and receives data identifying a recommendation based on the network management system utilizing the artificial intelligence model to process each of the plurality of masked packets and to generate a recommendation based on processing each of the plurality of masked packets.

In some implementations, the artificial intelligence model may identify a pattern related to an issue associated with the network device and/or the network (e.g., a series of events resulting in an occurrence of the issue, a periodic occurrence of the issue (e.g., daily, weekly, and/or the like), and/or the like) based on analyzing each of the plurality of masked packets. The artificial intelligence model may determine an action for resolving the issue. In some implementations, the artificial intelligence model may determine the action based on an action taken to resolve a similar issue.

The artificial intelligence model may identify a previous occurrence of the pattern resulting in the similar issue based on historical data associated with processing masked packets associated with the network device and/or the network. The artificial intelligence model may determine an action taken to resolve the similar issue. The artificial intelligence model may generate a recommendation that includes information identifying the pattern, information identifying the issue, information identifying the previous occurrence of the pattern, information identifying the similar issue, information identifying the action, and/or the like.

Figure 1G:
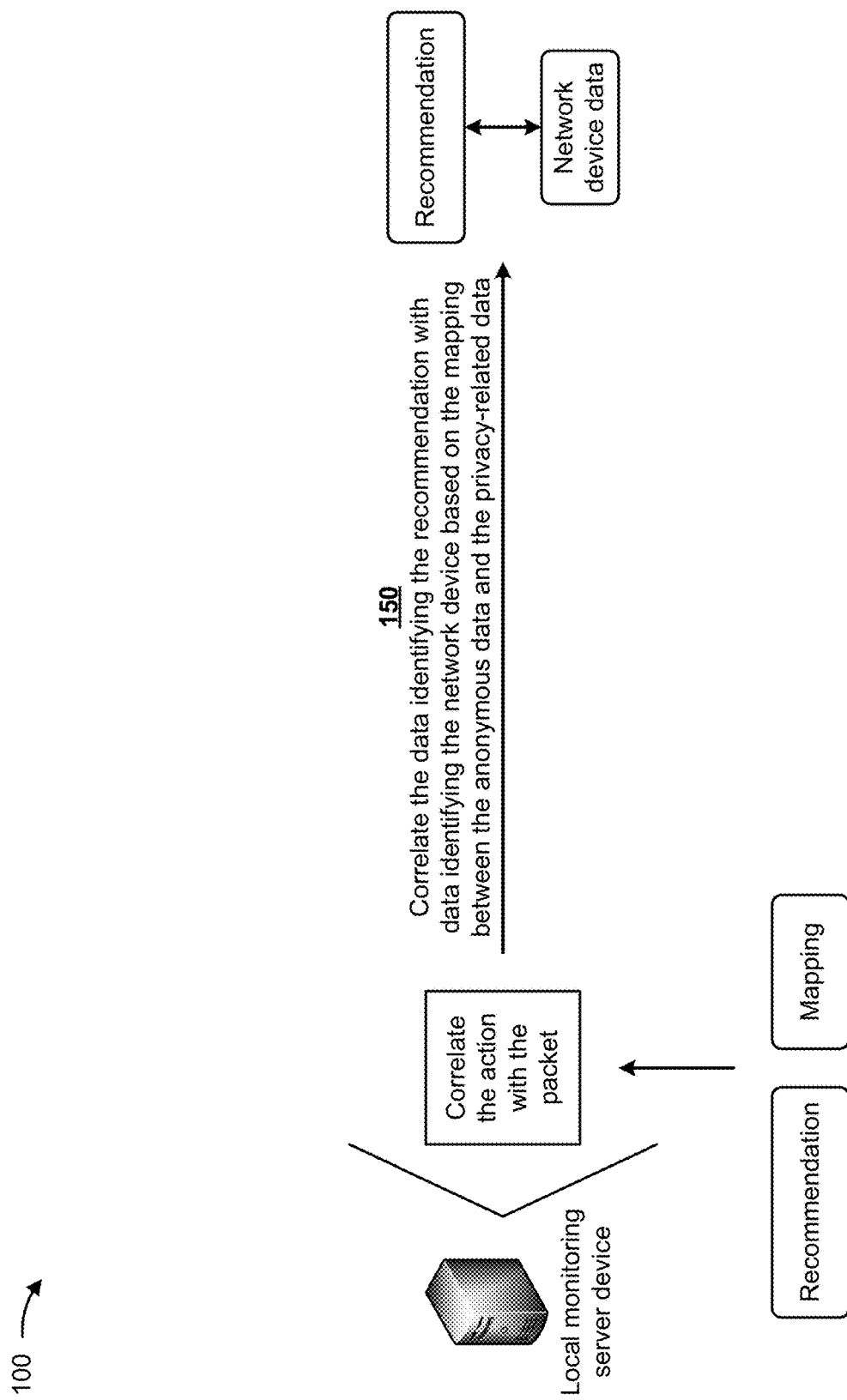

As shown in FIG. 1G, and by reference number 150, the local monitoring server device correlates the data identifying the recommendation with data identifying the network device based on the mapping between the anonymous data and the privacy-related data. The data identifying the recommendation may include the anonymous data included in the masked packet. For example, the data identifying the recommendation may include information associated with reducing the processor usage of the network device. The information associated with reducing the processor usage may include anonymous data generated for the device name associated with the network device, rather than the device name associated with the network device. The local monitoring server device may utilize the mapping to map the anonymous data to data identifying the device name associated with the network device included in the privacy-related data. The local monitoring server device may correlate the data identifying the recommendation with the data identifying the network device based on mapping the anonymous data to the data identifying the device name associated with the network device.

Figure 1H:
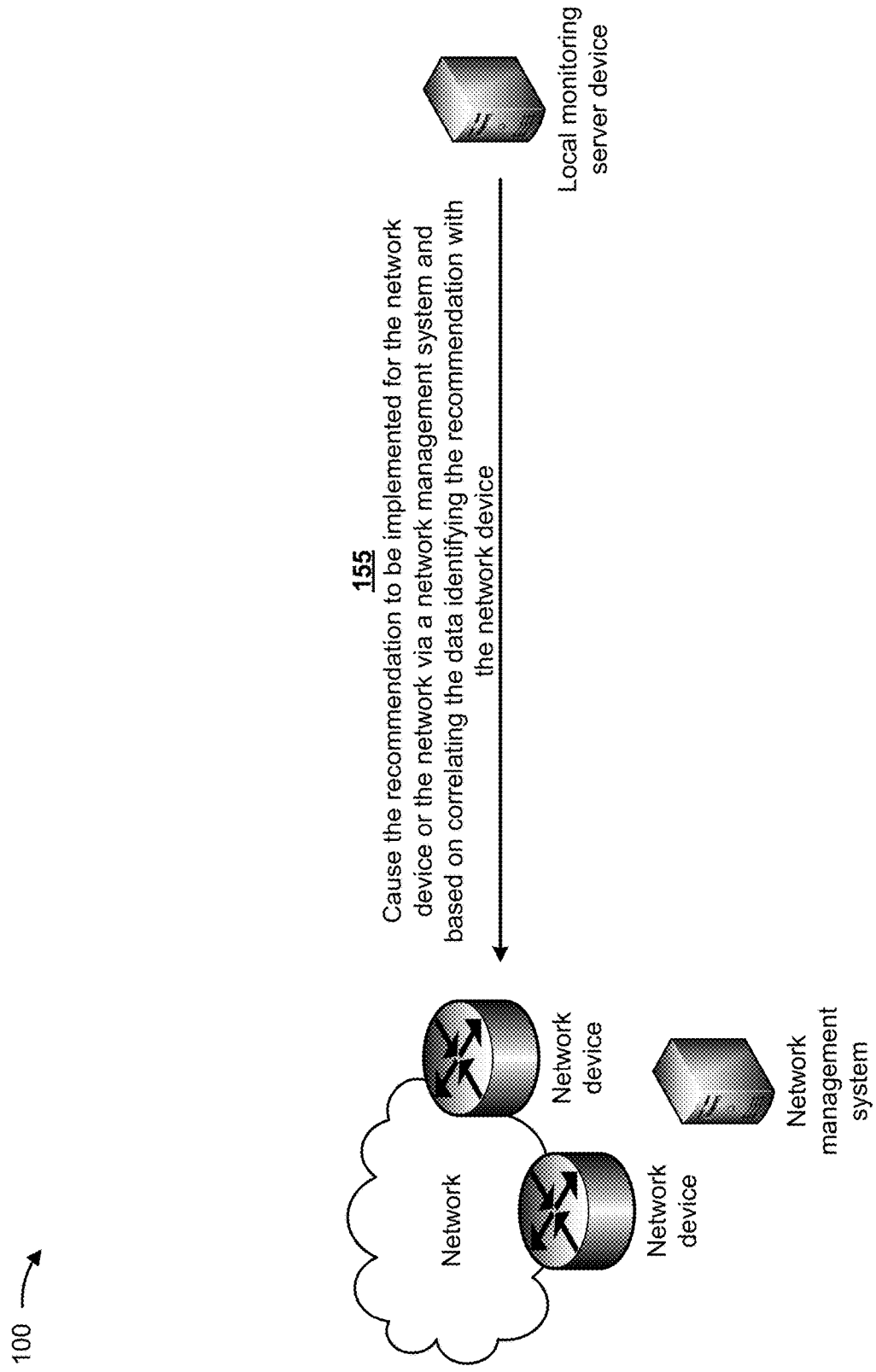

As shown in FIG. 1H, and by reference number 155, the local monitoring server device causes the recommendation to be implemented for the network device or the network via the network management system and based on correlating the data identifying the recommendation with the network device. The local monitoring server device may provide the data identifying the recommendation to the network management system based on correlating the data identifying the recommendation with data identifying the network device to cause the network management system to implement the recommendation for the network device and/or the network.

The network management system may receive the data identifying the recommendation from the local monitoring server device. The central server device may analyze the data identifying the recommendation and may perform one or more actions based on the analysis. For example, the network management system may determine to reduce a processor usage of the network device based on the data identifying the recommendation. The network management system may perform a load balancing function to reduce the processor usage of the network device based on determining to reduce the processor usage of the network device.

In this way, the local monitoring server device may enable issues associated with the network to be automatically and efficiently addressed by the network management system thereby conserving computing resources that may otherwise have been utilized to address the issues using a less efficient process and/or system.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

FIG. 2 is a diagram of an example environment 200 in which systems and/or methods described herein may be implemented. As shown in FIG. 2, environment 200 may include a local monitoring server device 210, a central server device 220, a network management system 230, a group of network devices 240 (shown as Network device 240-1 through Network device 240-N), and a network 250. Devices of environment 200 may interconnect via wired connections, wireless connections, or a combination of wired and wireless connections.

Local monitoring server device 210 includes one or more devices capable of receiving, storing, processing, generating, and/or providing information associated with providing anonymous network data to be used to train an artificial intelligence model and/or to be processed by the artificial intelligence model in near real-time, as described herein. For example, local monitoring server device 210 may include a server device (e.g., a host server, a web server, an application server, etc.), a data center device, and/or a similar device.

Central server device 220 includes one or more devices capable of receiving, storing, processing, generating, and/or providing information associated with training and/or utilizing an artificial intelligence model to process masked packets to perform a network analysis and/or to generate a recommendation based on the network analysis, as described herein. For example, central server device 220 may include a server device (e.g., a host server, a web server, an application server, etc.), a data center device, and/or a similar device.

Network management system 230 may include one or more devices capable of receiving, storing, processing, generating, and/or providing information associated with performing one or more actions associated with identifying, configuring, monitoring, updating, troubleshooting, and/or the like based on a recommendation generated by an artificial intelligence model, as described herein. For example, network management system 230 may include a communication and/or computing device, such as a server computer, laptop computer, personal computer, mobile phone, handheld computer, tablet computer, router, gateway, switch, or similar device. Network management system 230 may be able to communicate with network devices 240 (e.g., via network 250) in a manner enabling network management system 230 to perform the one or more actions.

Network device 240 includes one or more devices capable of receiving, processing, storing, routing, and/or providing traffic (e.g., a packet, other information or metadata, and/or the like) in a manner described herein. For example, network device 240 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 240 may include a gateway, a switch, a firewall, a hub, a bridge, a reverse proxy, a server (e.g., a proxy server, a cloud server, a data center server, and/or the like), a load balancer, and/or a similar device. In some implementations, network device 240 may be a physical device implemented within a housing, such as a chassis. In some implementations, network device 240 may be a virtual device implemented by one or more computing devices of a cloud computing environment or a data center. In some implementations, a group of network devices 240 may be a group of data center nodes that are used to route traffic flow through a network.

Network 250 includes one or more wired and/or wireless networks. For example, network 250 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. Network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
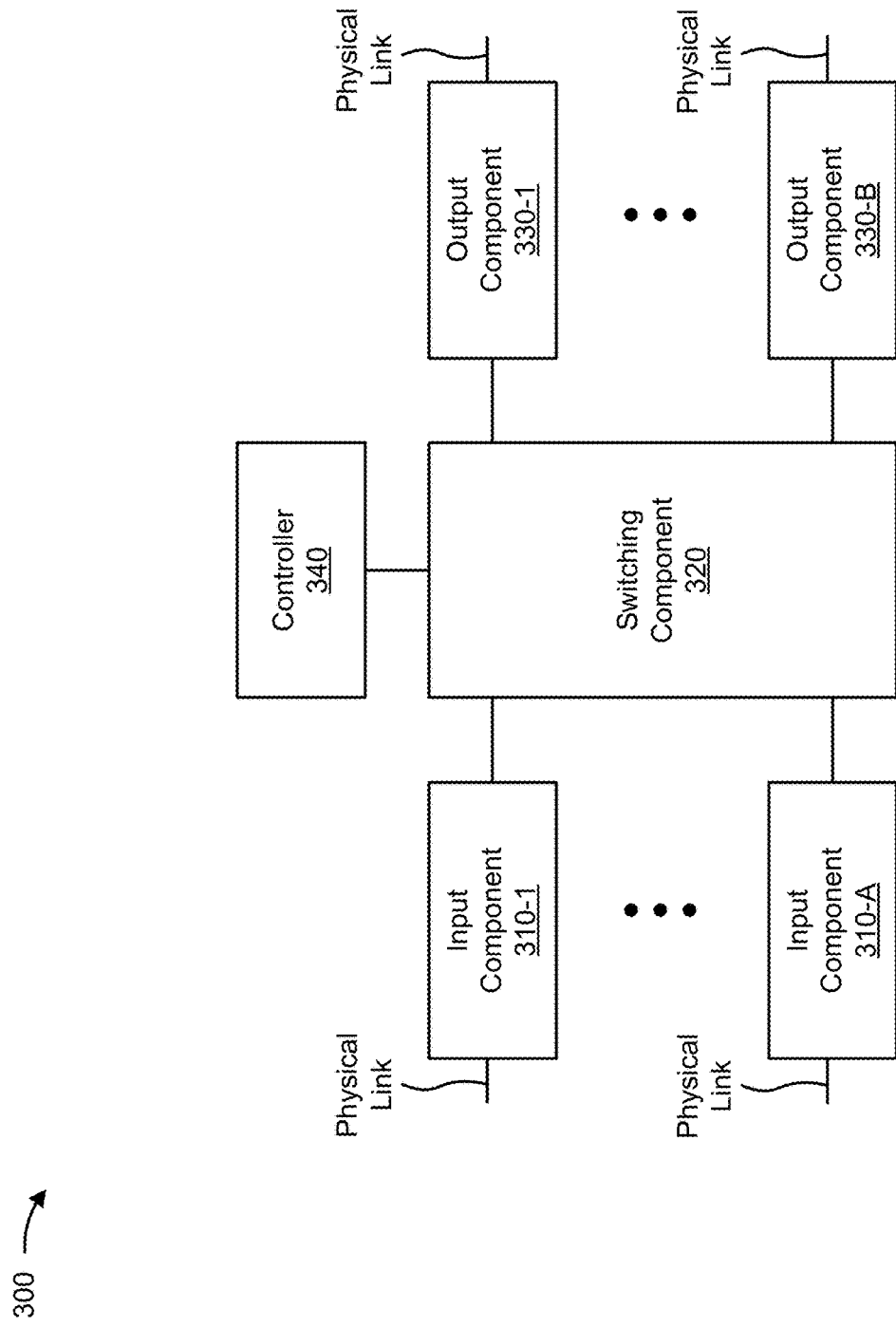
FIGS. 3 and 4 are diagrams of example components of one or more devices of FIG. 2.

FIG. 3 is a diagram of example components of a device 300. Device 300 may correspond to local monitoring server device 210, central server device 220, network management system 230, network device 240, and/or the like. In some implementations, local monitoring server device 210, central server device 220, network management system 230, network device 240, and/or the like may include one or more devices 300 and/or one or more components of device 300. As shown in FIG. 3, device 300 may include one or more input components 310-1 through 310-B (B≥1) (hereinafter referred to collectively as input components 310, and individually as input component 310), a switching component 320, one or more output components 330-1 through 330-C (C≥1) (hereinafter referred to collectively as output components 330, and individually as output component 330), and a controller 340.

Input component 310 may be one or more points of attachment for physical links and may be one or more points of entry for incoming traffic, such as packets. Input component 310 may process incoming traffic, such as by performing data link layer encapsulation or decapsulation. In some implementations, input component 310 may transmit and/or receive packets. In some implementations, input component 310 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 310.

Switching component 320 may interconnect input components 310 with output components 330. In some implementations, switching component 320 may be implemented via one or more crossbars, via busses, and/or with shared memories. The shared memories may act as temporary buffers to store packets from input components 310 before the packets are eventually scheduled for delivery to output components 330. In some implementations, switching component 320 may enable input components 310, output components 330, and/or controller 340 to communicate with one another.

Output component 330 may store packets and may schedule packets for transmission on output physical links. Output component 330 may support data link layer encapsulation or decapsulation, and/or a variety of higher-level protocols. In some implementations, output component 330 may transmit packets and/or receive packets. In some implementations, output component 330 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 330. In some implementations, input component 310 and output component 330 may be implemented by the same set of components (e.g., and input/output component may be a combination of input component 310 and output component 330).

Controller 340 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 340 may include one or more processors that can be programmed to perform a function.

In some implementations, controller 340 may include a RAM, a ROM, and/or another type of dynamic or static storage device (e.g., a flash memory, a magnetic memory, an optical memory, etc.) that stores information and/or instructions for use by controller 340.

In some implementations, controller 340 may communicate with other devices, networks, and/or systems connected to device 300 to exchange information regarding network topology. Controller 340 may create routing tables based on the network topology information, may create forwarding tables based on the routing tables, and may forward the forwarding tables to input components 310 and/or output components 330. Input components 310 and/or output components 330 may use the forwarding tables to perform route lookups for incoming and/or outgoing packets.

Controller 340 may perform one or more processes described herein. Controller 340 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 340 from another computer-readable medium or from another device via a communication interface. When executed, software instructions stored in a memory and/or storage component associated with controller 340 may cause controller 340 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
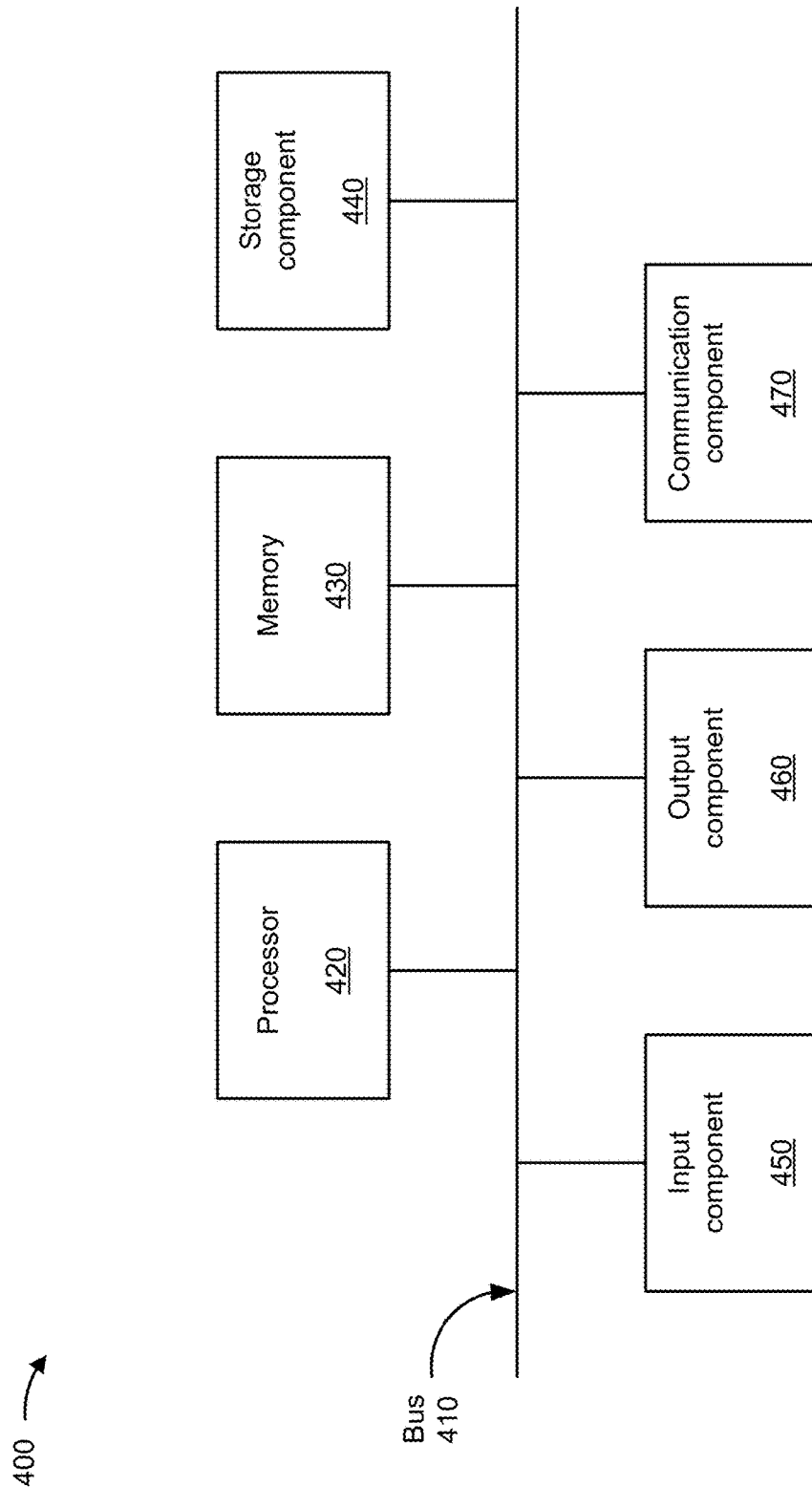

FIG. 4 is a diagram of example components of a device 400, which may correspond to local monitoring server device 210, central server device 220, network management system 230, and/or network device 240. In some implementations, local monitoring server device 210, central server device 220, network management system 230, and/or network device 240 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with providing anonymous network data to an artificial intelligence model for processing in near-real time. In some implementations, one or more process blocks of FIG. 5 may be performed by a device (e.g., local monitoring server device 210). In some implementations, one or more process blocks of FIG. 5 may be performed by another device or a group of devices separate from or including the device, such as a central server device (e.g., central server device 220, a network management system (e.g., network management system 230), a network device (e.g., network device 240), and/or the like. Additionally, or alternatively, one or more process blocks of FIG. 5 may be performed by one or more components of a device 300, such as input component 310, switching component 320, output component 330, controller 340, and/or one or more components of a device 400, such as processor 420, memory 430, storage component 440, input component 450, output component 460, communication component 470, and/or the like.

As shown in FIG. 5, process 500 may include receiving, from a network device in near-real time, a packet of data associated with network traffic of a network, wherein the packet includes privacy-related data and network-related data (block 510). For example, the device may receive, from a network device in near-real time, a packet of data associated with network traffic of a network, as described above. In some implementations, the packet includes privacy-related data and network-related data.

As further shown in FIG. 5, process 500 may include reading the privacy-related data from the packet (block 520).

For example, the device may read the privacy-related data from the packet, as described above.

As further shown in FIG. 5, process 500 may include generating anonymous data based on the privacy-related data of the packet, wherein the anonymous data obscures the privacy-related data (block 530). For example, the device may generate anonymous data based on the privacy-related data of the packet, as described above. In some implementations, the anonymous data obscures the privacy-related data.

As further shown in FIG. 5, process 500 may include generating a mapping between the anonymous data and the privacy-related data (block 540). For example, the device may generate a mapping between the anonymous data and the privacy-related data, as described above.

As further shown in FIG. 5, process 500 may include combining the anonymous data and the network-related data of the packet to generate a masked packet (block 550). For example, the device may combine the anonymous data and the network-related data of the packet to generate a masked packet, as described above.

As further shown in FIG. 5, process 500 may include providing the masked packet to a server device (block 560). For example, the device may provide the masked packet to a server device, as described above.

As further shown in FIG. 5, process 500 may include receiving, from the server device, data identifying a recommendation that is generated by processing the masked packet with an artificial intelligence model (block 570). For example, the device may receive, from the server device, data identifying a recommendation that is generated by processing the masked packet with an artificial intelligence model, as described above.

As further shown in FIG. 5, process 500 may include performing one or more actions based on the data identifying the recommendation (block 580). For example, the device may perform one or more actions based on the data identifying the recommendation, as described above.

Process 500 may include additional implementations, such as any single implementation or any combination of implementations described below and/or in connection with one or more other processes described elsewhere herein.

In a first implementation, performing the one or more actions comprises: correlating the data identifying the recommendation with data identifying the network device based on the mapping between the anonymous data and the privacy-related data, and causing the recommendation to be implemented for the network device or the network based on correlating the data identifying the recommendation with the data identifying the network device.

In a second implementation, alone or in combination with the first implementation, performing the one or more actions comprises: correlating the data identifying the recommendation with data identifying the network device based on the mapping between the anonymous data and the privacy-related data, and providing the data identifying the recommendation to a network management system associated with the network device, based on correlating the data identifying the recommendation with the data identifying the network device, to permit the network management system to implement the recommendation for the network device or the network.

In a third implementation, alone or in combination with one or more of the first and second implementations, the data identifying the recommendation includes the anonymous data of the masked packet.

In a fourth implementation, alone or in combination with one or more of the first through third implementations, the privacy-related data includes data identifying one or more of: an interface name associated with the network device, an identifier associated with the network device, a network address associated with the network device, a source port associated with the network device, or a destination port associated with the network device.

In a fifth implementation, alone or in combination with one or more of the first through fourth implementations, the network-related data includes data identifying one or more of: processor usage associated with the network device, a temperature of the network device, memory usage associated with the network device, an error associated with the network device, queue usage associated with the network device, or virtual interface usage associated with the network device.

In a sixth implementation, alone or in combination with one or more of the first through fifth implementations, the device receives the packet concurrently with the network device processing the packet to forward toward a destination of the packet.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 associated with providing anonymous network data to an artificial intelligence model for processing in near-real time. In some implementations, one or more process blocks of FIG. 6 may be performed by a device (e.g., local monitoring server device 210). In some implementations, one or more process blocks of FIG. 6 may be performed by another device or a group of devices separate from or including the device, such as a central server device (e.g., central server device 220, a network management system (e.g., network management system 230), a network device (e.g., network device 240), and/or the like. Additionally, or alternatively, one or more process blocks of FIG. 6 may be performed by one or more components of a device 300, such as input component 310, switching component 320, output component 330, controller 340, and/or one or more components of a device 400, such as processor 420, memory 430, storage component 440, input component 450, output component 460, communication component 470, and/or the like.

As shown in FIG. 6, process 600 may include receiving, from a network device in near-real time, a packet of data associated with network traffic of a network, wherein the packet includes privacy-related data and network-related data (block 610). For example, the device may receive, from a network device in near-real time, a packet of data associated with network traffic of a network, as described above. In some implementations, the packet includes privacy-related data and network-related data.

As further shown in FIG. 6, process 600 may include reading the privacy-related data from the packet (block 620). For example, the device may read the privacy-related data from the packet, as described above.

As further shown in FIG. 6, process 600 may include generating anonymous data based on the privacy-related data of the packet (block 630). For example, the device may generate anonymous data based on the privacy-related data of the packet, as described above.

As further shown in FIG. 6, process 600 may include generating a mapping between the anonymous data and the privacy-related data (block 640). For example, the device may generate a mapping between the anonymous data and the privacy-related data, as described above.

As further shown in FIG. 6, process 600 may include combining the anonymous data and the network-related data of the packet to generate a masked packet (block 650). For example, the device may combine the anonymous data and the network-related data of the packet to generate a masked packet, as described above.

As further shown in FIG. 6, process 600 may include providing the masked packet to a server device (block 660). For example, the device may provide the masked packet to a server device, as described above.

As further shown in FIG. 6, process 600 may include receiving, from the server device, data identifying a recommendation that is based on processing of the masked packet by an artificial intelligence model (block 670). For example, the device may receive, from the server device, data identifying a recommendation that is based on processing of the masked packet by an artificial intelligence model, as described above.

As further shown in FIG. 6, process 600 may include correlating the data identifying the recommendation with data identifying the network device based on the mapping between the anonymous data and the privacy-related data (block 680). For example, the device may correlate the data identifying the recommendation with data identifying the network device based on the mapping between the anonymous data and the privacy-related data, as described above.

As further shown in FIG. 6, process 600 may include performing one or more actions based on correlating the data identifying the recommendation with data identifying the network device (block 690). For example, the device may perform one or more actions based on correlating the data identifying the recommendation with data identifying the network device, as described above.

Process 600 may include additional implementations, such as any single implementation or any combination of implementations described below and/or in connection with one or more other processes described elsewhere herein.

In a first implementation, the network device is associated with a data center and the packet includes data associated with the data center.

In a second implementation, alone or in combination with the first implementation, the recommendation is associated with one or more of: reduce processor usage associated with the network device, reduce a temperature of the network device, reduce memory usage associated with the network device, correct an error associated with the network device, reduce queue usage associated with the network device, or reduce virtual interface usage associated with the network device.

In a third implementation, alone or in combination with one or more of the first and second implementations, process 600 includes causing the recommendation to be implemented for the network device or the network.

In a fourth implementation, alone or in combination with one or more of the first through third implementations, process 600 includes storing the mapping in a data structure associated with the device.

In a fifth implementation, alone or in combination with one or more of the first through fourth implementations, the recommendation is based on historical network traffic data associated with network devices of the network, other than the network device.

In a sixth implementation, alone or in combination with one or more of the first through fifth implementations, the artificial intelligence model includes a machine learning model.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flowchart of an example process 700 associated with providing anonymous network data to an artificial intelligence model for processing in near-real time. In some implementations, one or more process blocks of FIG. 7 may be performed by a device (e.g., local monitoring server device 210). In some implementations, one or more process blocks of FIG. 7 may be performed by another device or a group of devices separate from or including the device, such as a central server device (e.g., central server device 220, a network management system (e.g., network management system 230), a network device (e.g., network device 240), and/or the like. Additionally, or alternatively, one or more process blocks of FIG. 7 may be performed by one or more components of a device 300, such as input component 310, switching component 320, output component 330, controller 340, and/or one or more components of a device 400, such as processor 420, memory 430, storage component 440, input component 450, output component 460, communication component 470, and/or the like.

As shown in FIG. 7, process 700 may include receiving, from a plurality of network devices in near-real time, a plurality of packets of data associated with network traffic of a network, wherein the plurality of packets includes privacy-related data and network-related data (block 710). For example, the device may receive, from a plurality of network devices in near-real time, a plurality of packets of data associated with network traffic of a network, as described above. In some implementations, the plurality of packets includes privacy-related data and network-related data.

As further shown in FIG. 7, process 700 may include reading the privacy-related data from the plurality of packets (block 720). For example, the device may read the privacy-related data from the plurality of packets, as described above.

As further shown in FIG. 7, process 700 may include generating anonymous data based on the privacy-related data of the plurality of packets (block 730). For example, the device may generate anonymous data based on the privacy-related data of the plurality of packets, as described above.

As further shown in FIG. 7, process 700 may include generating a mapping between the anonymous data and the privacy-related data (block 740). For example, the device may generate a mapping between the anonymous data and the privacy-related data, as described above.

As further shown in FIG. 7, process 700 may include combining the anonymous data and the network-related data of the plurality of packets to generate a plurality of masked packets (block 750). For example, the device may combine the anonymous data and the network-related data of the plurality of packets to generate a plurality of masked packets, as described above.

As further shown in FIG. 7, process 700 may include providing the plurality of masked packets to a server device (block 760). For example, the device may provide the plurality of masked packets to a server device, as described above.

As further shown in FIG. 7, process 700 may include receiving, from the server device, data identifying one or more recommendations that are based on the plurality of masked packets being processed by an artificial intelligence model (block 770). For example, the device may receive, from the server device, data identifying one or more recommendations that are based on the plurality of masked packets being processed by an artificial intelligence model, as described above.

As further shown in FIG. 7, process 700 may include performing one or more actions based on the data identifying the one or more recommendations (block 780). For example, the device may perform one or more actions based on the data identifying the one or more recommendations, as described above.

Process 700 may include additional implementations, such as any single implementation or any combination of implementations described below and/or in connection with one or more other processes described elsewhere herein.

In a first implementation, process 700 includes correlating the data identifying the one or more recommendations with data identifying the plurality of networks devices based on the mapping between the anonymous data and the privacy-related data; and causing the one or more recommendations to be implemented for one or more of the plurality of network devices based on correlating the data identifying the one or more recommendations with the data identifying the plurality of networks devices.

In a second implementation, alone or in combination with the first implementation, process 700 includes correlating the data identifying the one or more recommendations with data identifying the plurality of network devices based on the mapping between the anonymous data and the privacy-related data; and providing the data identifying the one or more recommendations to a network management system associated with the plurality of network devices, based on correlating the data identifying the one or more recommendations with the data identifying the plurality of network devices, to permit the network management system to implement the one or more recommendations for one or more of the plurality of network devices.

In a third implementation, alone or in combination with one or more of the first and second implementations, the data identifying the one or more recommendations includes the anonymous data of the plurality of masked packets.

In a fourth implementation, alone or in combination with one or more of the first through third implementations, the privacy-related data includes data identifying one or more of: a plurality of interfaces associated with the plurality of network devices, a plurality of identifiers associated with the plurality of network devices, a plurality of network addresses associated with the plurality of network devices, a plurality of source ports associated with the plurality of network devices, or a plurality of destination ports associated with the plurality of network devices.

In a fifth implementation, alone or in combination with one or more of the first through fourth implementations, the network-related data includes data identifying one or more of: processor usage associated with the plurality of network devices, a plurality of temperatures of the plurality of network devices, memory usage associated with the plurality of network devices, one or more errors associated with one or more of the plurality of network devices, queue usage associated with the plurality of network devices, or virtual interface usage associated with the plurality of network devices.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

receiving, by a device and from a network device in near-real time, a packet of data associated with network traffic of a network,
wherein the packet includes privacy-related data and network-related data;

reading, by the device, the privacy-related data from the packet;

generating, by the device, anonymous data based on the privacy-related data of the packet,
wherein the anonymous data obscures the privacy-related data;

generating, by the device, a mapping between the anonymous data and the privacy-related data;

combining, by the device, the anonymous data and the network-related data of the packet to generate a masked packet;

providing, by the device, the masked packet to a server device;

receiving, by the device and from the server device, data identifying a recommendation that is generated by processing the masked packet with an artificial intelligence model; and performing, by the device, one or more actions based on the data identifying the recommendation.

2. The method of claim 1, wherein performing the one or more actions comprises:

correlating the data identifying the recommendation with data identifying the network device based on the mapping between the anonymous data and the privacy-related data; and causing the recommendation to be implemented for the network device or the network based on correlating the data identifying the recommendation with the data identifying the network device.

3. The method of claim 1, wherein performing the one or more actions comprises:

correlating the data identifying the recommendation with data identifying the network device based on the mapping between the anonymous data and the privacy-related data; and providing the data identifying the recommendation to a network management system associated with the network device, based on correlating the data identifying the recommendation with the data identifying the network device, to permit the network management system to implement the recommendation for the network device or the network.

4. The method of claim 1, wherein the data identifying the recommendation includes the anonymous data of the masked packet.

5. The method of claim 1, wherein the privacy-related data includes data identifying one or more of:

an interface name associated with the network device,
an identifier associated with the network device,
a network address associated with the network device,
a source port associated with the network device, or
a destination port associated with the network device.

6. The method of claim 1, wherein the network-related data includes data identifying one or more of:

processor usage associated with the network device,
a temperature of the network device,
memory usage associated with the network device,
an error associated with the network device,
queue usage associated with the network device, or
virtual interface usage associated with the network device.

7. The method of claim 1, wherein the device receives the packet concurrently with the network device processing the packet to forward toward a destination of the packet.

8. A device, comprising:

one or more memories; and one or more processors, communicatively coupled to the one or more memories, to:

receive, from a network device in near-real time, a packet of data associated with network traffic of a network,
wherein the packet includes privacy-related data and network-related data;

read the privacy-related data from the packet;

generate anonymous data based on the privacy-related data of the packet;

generate a mapping between the anonymous data and the privacy-related data;

combine the anonymous data and the network-related data of the packet to generate a masked packet;

provide the masked packet to a server device;

receive, from the server device, data identifying a recommendation that is based on processing of the masked packet by an artificial intelligence model; and correlate the data identifying the recommendation with data identifying the network device based on the mapping between the anonymous data and the privacy-related data; and perform one or more actions based on correlating the data identifying the recommendation with data identifying the network device.

9. The device of claim 8, wherein the network device is associated with a data center and the packet includes data associated with the data center.

10. The device of claim 8, wherein the recommendation is associated with one or more of:

reduce processor usage associated with the network device,
reduce a temperature of the network device,
reduce memory usage associated with the network device,
correct an error associated with the network device,
reduce queue usage associated with the network device, or
reduce virtual interface usage associated with the network device.

11. The device of claim 8, wherein the one or more processors, when performing the one or more actions, are to:

cause the recommendation to be implemented for the network device or the network.

12. The device of claim 8, wherein the one or more processors are further to:

store the mapping in a data structure associated with the device.

13. The device of claim 8, wherein the recommendation is based on historical network traffic data associated with network devices of the network, other than the network device.

14. The device of claim 8, wherein the artificial intelligence model includes a machine learning model.

15. A non-transitory computer-readable medium storing instructions, the instructions comprising:

one or more instructions that, when executed by one or more processors, cause the one or more processors to:

receive, from a plurality of network devices in near-real time, a plurality of packets of data associated with network traffic of a network, wherein the plurality of packets includes privacy-related data and network-related data;
read the privacy-related data from the plurality of packets;
generate anonymous data based on the privacy-related data of the plurality of packets;
generate a mapping between the anonymous data and the privacy-related data;
combine the anonymous data and the network-related data of the plurality of packets to generate a plurality of masked packets;
provide the plurality of masked packets to a server device;
receive, from the server device, data identifying one or more recommendations that are based on the plurality of masked packets being processed by an artificial intelligence model; and
perform one or more actions based on the data identifying the one or more recommendations.

16. The non-transitory computer-readable medium of claim 15, wherein the one or more instructions, that cause the one or more processors to perform the one or more actions, cause the one or more processors to:
correlate the data identifying the one or more recommendations with data identifying the plurality of networks devices based on the mapping between the anonymous data and the privacy-related data; and
cause the one or more recommendations to be implemented for one or more of the plurality of network devices based on correlating the data identifying the one or more recommendations with the data identifying the plurality of networks devices.

17. The non-transitory computer-readable medium of claim 15, wherein the one or more instructions, that cause the one or more processors to perform the one or more actions, cause the one or more processors to:
correlate the data identifying the one or more recommendations with data identifying the plurality of network devices based on the mapping between the anonymous data and the privacy-related data; and
provide the data identifying the one or more recommendations to a network management system associated with the plurality of network devices, based on correlating the data identifying the one or more recommendations with the data identifying the plurality of network devices, to permit the network management system to implement the one or more recommendations for one or more of the plurality of network devices.

18. The non-transitory computer-readable medium of claim 15, wherein the data identifying the one or more recommendations includes the anonymous data of the plurality of masked packets.

19. The non-transitory computer-readable medium of claim 15, wherein the privacy-related data includes data identifying one or more of:
a plurality of interfaces associated with the plurality of network devices,
a plurality of identifiers associated with the plurality of network devices,
a plurality of network addresses associated with the plurality of network devices,
a plurality of source ports associated with the plurality of network devices, or
a plurality of destination ports associated with the plurality of network devices.

20. The non-transitory computer-readable medium of claim 15, wherein the network-related data includes data identifying one or more of:
processor usage associated with the plurality of network devices,
a plurality of temperatures of the plurality of network devices,
memory usage associated with the plurality of network devices,
one or more errors associated with one or more of the plurality of network devices, queue usage associated with the plurality of network devices, or
virtual interface usage associated with the plurality of network devices.

* * * * *